INVENTORS
Sheldon B. Heath and
William P. Schambra
by their attorneys
Stebbins and Blenko Oct. 19, 1943.   S. B. HEATH ET AL   2,332,224
GAS AND LIQUID CONTACT APPARATUS
Filed Feb. 25, 1941   3 Sheets-Sheet 2

INVENTORS
Sheldon B. Heath and
William P. Schambra
by their attorneys
Stebbins and Blenko Oct. 19, 1943.   S. B. HEATH ET AL   2,332,224
GAS AND LIQUID CONTACT APPARATUS
Filed Feb. 25, 1941   3 Sheets-Sheet 3

INVENTORS
Sheldon B. Heath and
William P. Schambra
by their attorneys
Stebbins and Blenko

UNITED STATES PATENT OFFICE 2,332,224

GAS AND LIQUID CONTACT APPARATUS

Sheldon B. Heath and William P. Schambra, Midland, Mich., assignors to Blaw-Knox Company, Pittsburgh, Pa., a corporation of New Jersey Application February 25, 1941, Serial No. 380,482

1 Claim. (Cl. 261—94)

This invention relates to apparatus for bringing a gas into intimate contact with a liquid and, in particular, to a gas and liquid contact apparatus of relatively small size capable of handling large volumes of gas without materially reducing the pressure thereof.

Various forms of gas and liquid contact apparatus have been known heretofore. Perhaps one of the commonest is the simple vertical tower filled with inert packing through which the liquid percolates by gravity and the gas is blown upward, counter to the flow of the liquid. The use of such apparatus involves some difficulties which increase as the volume and velocity of gas flow increase, particularly where beds of large horizontal area and shallow depth are employed. One difficulty, known as "channeling," is the blowing of relatively "dry holes" through the packing by the gas, through which gas passes without adequate treatment. Other difficulties arise from the fact that with such apparatus, the means for applying the liquid must uniformly distribute it over a large area, and yet be such that it does not obstruct the gas flow, or produce a spray from which liquid droplets are blown out by the gas stream. Because of these difficulties, it has been usual to accept poor liquid distribution in packing as a necessary evil and to try to compensate for this by increasing the thickness of the bed, the actual thickness used in some cases being several times that which would be suitable if a uniform distribution of liquid could be obtained, and channeling completely avoided. This expedient requires very large apparatus with relatively great resistance to high velocity gas flow.

We have invented a novel form of gas and liquid contact apparatus which insures intimate contact of all the gas being treated with the liquid. At the same time, all portions of the gas stream have about the same contact with the liquid whereby a uniform treatment of the gas may be effected. In a preferred embodiment of the invention, we provide a porous mass extending across the gas stream and supply liquid to the top of the mass for percolation therethrough. The porous mass is preferably in the form of a layer of fragments of relatively inert material of such size that the gas may flow through it with but little drop in pressure. The layer is preferably disposed in a generally vertical position, but is inclined slightly with its top toward the direction from which the gas approaches. Liquid supplied at the top of a layer, therefore, flows downwardly therethrough, generally parallel to the faces of the layer along the resultant of the force of gravity and the force of the air stream. By this arrangement, the effective thickness of the layer is the same from top to bottom as contrasted with a truly vertical layer wherein liquid supplied at the top is gradually blown toward the outgoing face as it descends, leaving the fragments of the layer near the bottom and near the incoming face relatively dry. With our apparatus channeling does not occur to any great extent. The gas flow, which is not opposite that of the liquid but is substantially normal thereto, merely tends to displace the liquid horizontally and does not channel the packing, as in the usual arrangement where gas flows upward and liquid downward.

One of the numerous applications for which the invention is suited is the dehumidification of the air supply for a blast furnace. Hygroscopic solutions are available which take up water vapor from an air stream in contact therewith and the use of such solution as the liquid in our gas and liquid contact apparatus provides an effective dehumidification for blast furnace air. As is well known, the air requirements of a modern blast furnace are quite large, running as high as 50,000 or 60,000 cubic feet of air per minute and, for satisfactory operation, the air must reach the furnace with its pressure substantially undiminished. The invention meets all these requirements, of an installation for the dehumidification of blast furnace air, as will appear to those skilled in the art from the following detailed description and explanation which refer to the accompanying drawings illustrating two possible forms of apparatus utilizing the principle of our invention. In the drawings, Fig. 1 is a partial central vertical section through an apparatus in the form of a vertical tower for dehumidifying air passing upwardly therethrough;

Figure 1:
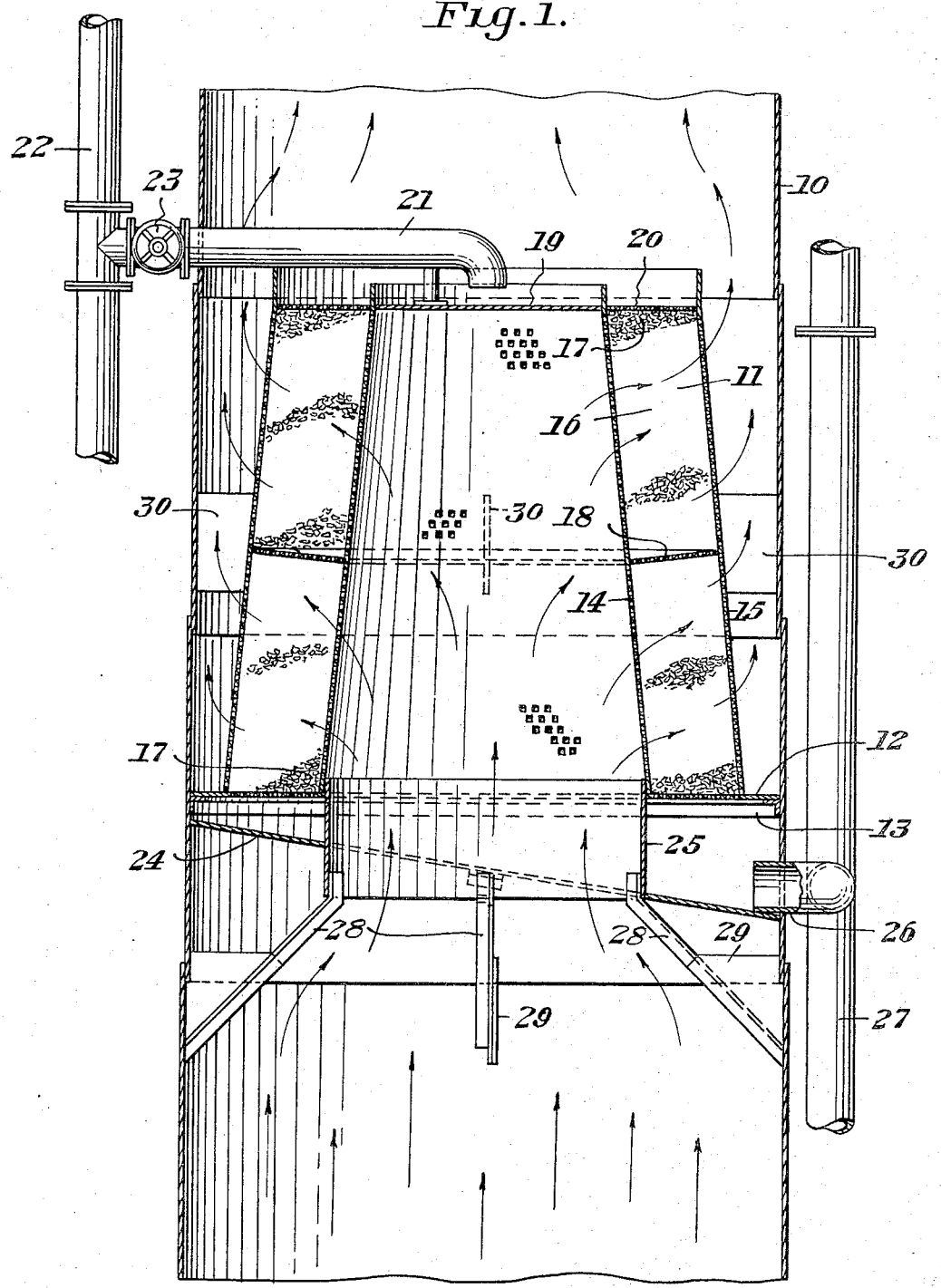

Referring now in detail to the drawings and for the present to Fig. 1 in particular, a substantially vertical cylindrical tower or duct 10 is fabricated from plate and provides a shell or housing for enclosing the gas and liquid contact apparatus indicated generally at 11. An annular plate 12 is disposed transversely of the duct or tower 10 and may conveniently be supported on an angle ring 13. The plate 12 is perforated adjacent its inner edge as shown in the drawings. Radially spaced perforated frusto-conical plates 14 and 15 resting on the plate 12 provide an annular frusto-conical space 16 therebetween. The space 16 is provided with a porous filling 17 of any suitable inert material such as Raschig rings or other equivalent material in the form of fragments, such as broken brick, tile or the like, readily permeable by gas. An intermediate annular perforated plate 18 disposed substantially midway of the height of the space 16 supports the upper portion of the filling 17 independently of the lower portion thereof and prevents excessive settling thereof.

A closure plate 19 is disposed adjacent, but slightly below, the top of the frusto-conical wall 14. A perforated annular top plate 20 is disposed between the walls 14 and 15 adjacent their upper ends. As shown in the drawings, the upper edge of the wall 14 is spaced slightly below the upper edge of the wall 15.

An inlet pipe 21 extends through the wall of the shell 10 being connected to a liquid supply system indicated generally at 22. By means of a valve 23 fluid may be supplied from the system 22 through the pipe 21 at the desired rate to the receptacle formed by the closure plate 19 and the upper edge of the wall 14. From the pool thus formed, liquid flows over the upper edge of the wall 14 which provides a weir and flows downwardly onto the perforated plate 20. The liquid is thus distributed uniformly around the top of the annular mass of porous filling 17 and flows downwardly through the latter.

The gas to be treated flows through the duct or tower 10, in an ascending stream. As indicated by the arrows, the gas flows into the space within the wall 14 and thence in a generally horizontal direction radially through the annular porous filling 17 and on up through the duct 10. It will be apparent that the air passing through the porous filling is brought into intimate contact with the liquid as the latter percolates downwardly through the filling. It will be observed that, in effect, the annular filling 17 constitutes a porous layer inclined with its top toward the direction from which the gas flows toward and through the filling.

A sloping annular plate 24 is disposed below the plate 12. A cylindrical wall 25 extends upwardly from the inner edge of the plate 24 toward and through the plate 12. The liquid descending through the porous filling 17 is discharged onto the plate 24 which serves as a collector plate. An outlet pipe 26 extends through the wall of the tower 10 adjacent the low side of the plate 24 and is connected to a return pipe 27 delivering the liquid to the supply system 22 after passing through suitable processing apparatus for the removal of water, if desired. Angle-iron brackets 28 and gusset plates 29 support the inner edge of the plate 12 through the cylindrical wall 25 from the wall of the duct 10. The frusto-conical walls 14 and 15 are further braced from the wall of the duct 10 by plates 30.

It will be apparent that liquid descending through the filling 17 is subject to two forces, i. e., the downward force of gravity and the generally horizontal force of the air traversing the mass. The liquid will flow, therefore, generally along the resultant of these forces. The slope of the walls 14 and 15 is substantially the same as that of the resultant of the gravity and air force on the liquid. By virtue of this construction, the liquid flows downwardly through the filling 17 in paths substantially parallel to the walls 14 and 15, thereby maintaining substantially the entire mass of the filling uniformly wetted. Air passing through the porous filling is thus subjected to substantially the same degree of contact with the liquid whether it traverses the filling adjacent the upper edges of the walls 14 and 15 or adjacent the lower edges thereof.

This is in contrast to the results obtained with a porous layer which is substantially vertical. With such arrangement, the descending liquid is blown progressively toward the exit face of the porous layer so that the entering face, adjacent the lower portion of the layer, is substantially dry. This means that gas passing through the upper portion of the layer is subject to much greater contact with the liquid than the portion of the gas traversing the lower portion of the layer.

Figure 2:
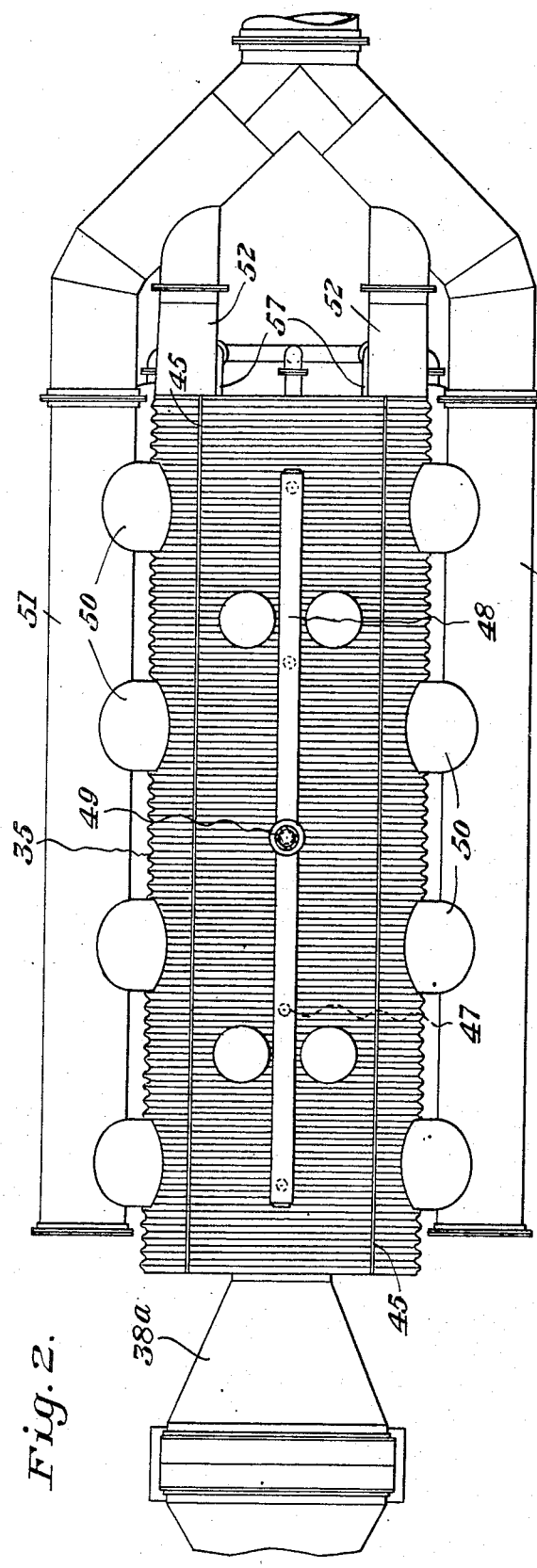
Fig. 2 is a plan view of a different form of apparatus.
Figure 3:
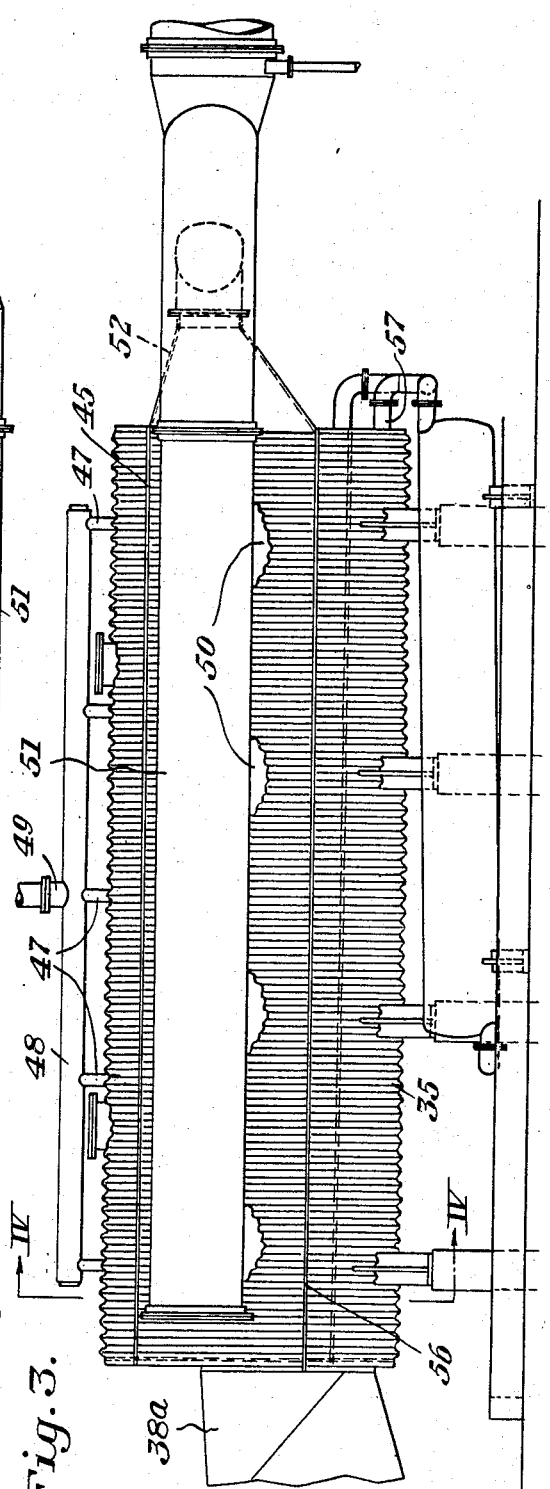
Fig. 3 is a side elevation thereof.
Figure 4:
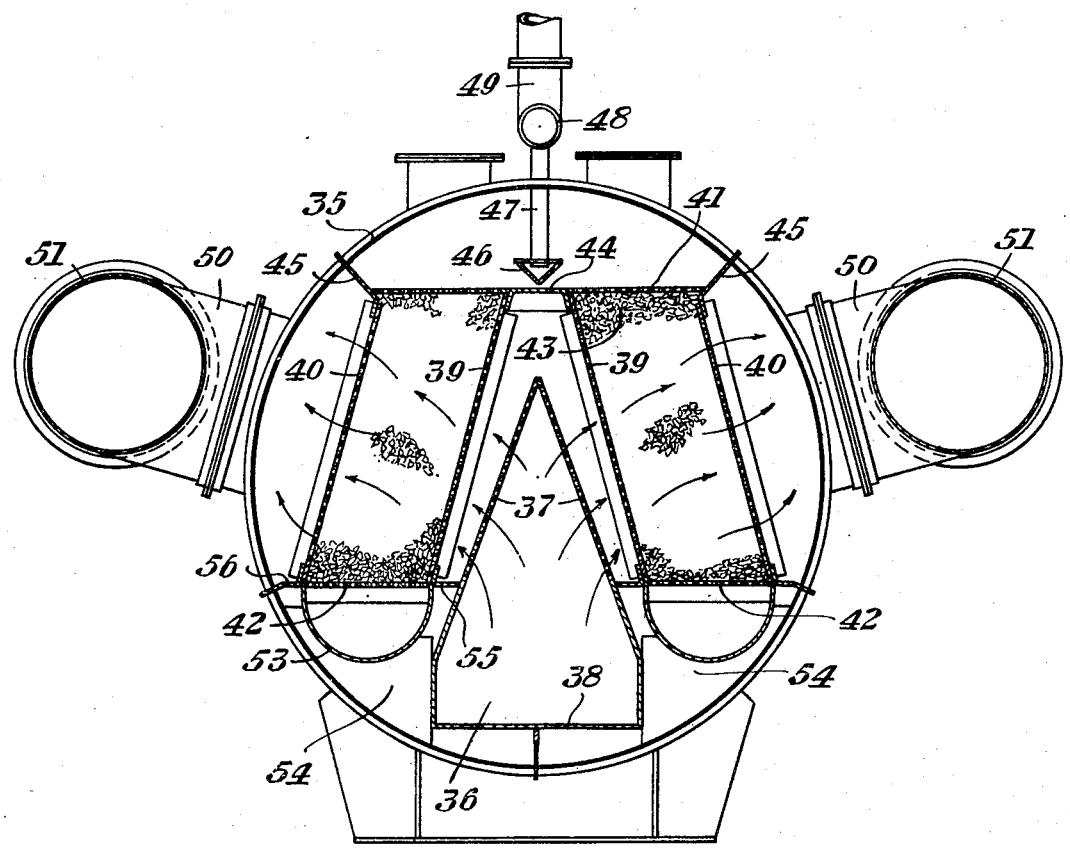
Fig. 4 is a transverse section taken substantially along the plane of line IV—IV of Fig. 3.

Referring now more particularly to Figures 2 through 4, a different form of apparatus is illustrated, comprising an elongated tubular shell 35 fabricated from corrugated plate and disposed generally horizontally. A gas duct 36 extending longitudinally through the shell 35 is defined by upwardly converging walls 37 and a bottom 38, the walls 37 being perforated for a portion of their height downwardly from their meeting point. A gas inlet 38a at one end of the shell communicates with the duct 36. Spaced perforated walls 39 and 40 extend longitudinally of the shell 35 on each side of the gas duct 36. Perforated top and bottom plates 41 and 42 cooperate with the walls 39 and 40 to provide spaces for porous fillings 43 similar to that shown at 17 in Figure 1. The space between the plates 41 is closed by a filler plate 44 and side plates 45 extend from the outer edges of the plates 41 to the wall of the shell 35.

A liquid supply trough 46 extends along above the filler plate 44. Branch pipes 47 extend downwardly from a manifold 48 and supply liquid to the trough at various points therealong. The manifold has an upwardly extending connection 49 to a liquid supply system. It will be apparent that, by virtue of this construction, liquid is supplied to the trough 46, overflowing the edges thereof, and is distributed uniformly over the area of the plates 41 and 44 between the side walls 45. The liquid then flows through the perforations in the plate 41 and downwardly through the fillings 43.

Gas off-takes 50 extend laterally from the shell 35 to collecting ducts 51. Additional off-takes 52 extend from the sides of the shell at the end opposite the inlet 38a and connect with the ducts 51. Gas supplied through the duct 36, as by a blower disposed ahead of the inlet 38, flows along the duct 36 and upwardly and laterally thereof, as shown by the arrows, through the fillings 43 between the plates 39 and 40 and thence through the off-takes 50 into the collector ducts 51.

The liquid descending through the fillings 43 passes through the perforated bottom plates 42 and into collecting troughs 53 extending along therebelow. The troughs 53 are carried on plates 54 secured inside the shell near the bottom thereof. Filler plates 55 extend between the walls 37 and 39 adjacent the bottom of the latter and side walls 56 extend upwardly from the lower edges of the walls 40 to the shell 35. By-passing of the porous fillings by the gas is thus prevented and all the gas is compelled to pass through the full thickness of the porous layer between the walls 39 and 40.

Outlet pipes 57 conduct the liquid from the troughs 53 to a recirculating system for return to the manifold 48 after suitable dehydration, if necessary.

It will be apparent from the foregoing description and explanation that our invention is characterized by numerous advantages over apparatus previously known for obtaining intimate contact between gas and liquid. Our invention provides uniform distribution of a liquid over a layer of porous contact material and a relatively short path through the latter for the gas, so that the velocity and pressure of the gas are maintained without material diminution. The arrangement of the porous layer of contact material in an inclined position, furthermore, causes the liquid descending therethrough to parallel substantially the resultant of the force of gravity and the force exerted on the liquid by the gas, thus maintaining the full thickness of the porous layer uniformly moist from top to bottom.

A very important advantage of our invention is the simple and satisfactory manner by which solution may be distributed where the invention is employed. In air conditioning problems like the blast furnace application, using the preferred hygroscopic solutions, sufficient drying of the air is obtained by passing the air through a relatively shallow bed of contact material. With large air volumes involved the normal contact tower, having vertical, countercurrent flows of air and solution, requires a large ground area, relatively low height (which is usually no advantage), and a large volume of contact surface wetting solution. The solution distribution system for a large ground area gets rather complicated, and sprays involve solution entrainment loss and nuisance. In our invention, with the contact bed in a vertical plane instead of a horizontal plane, the ground area required is small, the solution surface wetting volume is small and there is a continuous surface from the top of the shell to the bottom. The solution can easily be distributed to the top and removed from the bottom of the contact bed out of contact with the air stream, thus minimizing droplet entrainment.

As previously stated, the invention finds immediate practical application in the dehumidification of air for blast furnaces. Hygroscopic solutions such as that described in Patent 2,143,008 effect satisfactory removal of water vapor from atmospheric air in a relatively short time of contact. It will be apparent, however, that the invention is not limited to the dehumidification of air but has utility wherever contact between a gas and liquid is to be effected. In any event, the invention provides a compact apparatus which distributes the liquid uniformly across the area of the gas stream and exposes a maximum of liquid-covered surface to the gas throughout the path of the latter, at the same time creating a minimum impedance to the flow of the gas. The wetted surface of the Raschig rings or other similar fragments provides a compact mass which produces a high degree of exposure of the liquid to the gas while permitting free flow of both the liquid and gas through the mass. All portions of the gas stream are brought into intimate contact with the liquid coating the surface of the inert fragments of the porous layer. Since the porous layer is wetted uniformly throughout its thickness and area, a thinner layer may be used than would be necessary with any arrangement in which, as above explained, a substantial portion of the porous mass is not maintained wet.

In a specific embodiment, gas was passed through a porous mass in the form of a rectangular prism 1' square in section and 5' high and inclined at about 75° toward the direction from which the gas approached. A hygroscopic solution was supplied over the top of the prism and flowed by gravity downwardly through the porous mass. An air flow of 500 cubic feet per minute was maintained, the entering air being at 82° F. with a dew point of 52° F. The air leaving the porous mass was at a temperature of 98° F. with a dew point of 34° F. The temperature of the solution was approximately 100° F. and the pressure drop across the porous mass was only .7" of water.

Although we have illustrated and described but two preferred embodiments of our invention, it will be understood that changes in the construction and arrangement of parts as disclosed may be made without departing from the spirit of the invention or the scope of the appending claim.

We claim:

Apparatus for bringing a gas into contact with a liquid comprising a generally cylindrical chamber with a substantially vertical axis, through which chamber the gas flows upwardly, a baffle arranged transversely of the chamber having a generally circular opening, a perforate wall in the form of a frustum of a cone extending upwardly from the opening, a baffle extending across the top of the frustum so that gas entering the frustum must pass through the perforate wall thereof, a second frustum having a perforate wall and surrounding the first frustum but spaced therefrom so as to define a contact zone, the horizontal cross-section of the zone at the top having an area approximating the horizontal cross-section at the bottom, the two frusta being substantially uniformly spaced apart, a porous filling between said frusta, means for supplying the liquid over substantially the entire top area of the filling, and means for taking off liquid over substantially the entire bottom area thereof, the walls of the frusta being sloped downwardly and outwardly and at an angle corresponding generally to the travel of the liquid through the porous mass under the combined influence of gravity and of the flowing gas, whereby channeling of the liquid is avoided.

SHELDON B. HEATH.
WILLIAM P. SCHAMBRA.